United States Patent
Tanaka et al.

[11] Patent Number: 5,173,830
[45] Date of Patent: Dec. 22, 1992

[54] TAPE CASSETTE WITH TAPERED SELF-ALIGNING REEL HUBS

[75] Inventors: Masato Tanaka; Kiyotaka Yanaka, both of Tokyo, Japan

[73] Assignee: Sony Corporation, Tokyo, Japan

[21] Appl. No.: 622,787

[22] Filed: Dec. 5, 1990

[30] Foreign Application Priority Data

Dec. 6, 1989 [JP] Japan .................................. 1-317028

[51] Int. Cl.$^5$ ............................................. G11B 23/02
[52] U.S. Cl. ..................... 360/132; 360/137; 242/198
[58] Field of Search ............ 360/132, 137; 242/198, 242/199

[56] References Cited

U.S. PATENT DOCUMENTS

| | | | |
|---|---|---|---|
| 4,643,304 | 2/1987 | Samida et al. | 360/132 |
| 4,648,000 | 3/1987 | Shibaike et al. | 360/132 |
| 4,672,498 | 6/1987 | Harada | 360/132 |
| 4,781,340 | 11/1988 | Shiba et al. | 360/132 |
| 4,881,137 | 11/1989 | Meguro et al. | 360/132 |
| 4,916,566 | 4/1990 | Urayama | 360/132 |
| 4,926,279 | 5/1990 | Kurashina et al. | 360/132 |
| 4,947,276 | 8/1990 | Meguro | 360/132 |

Primary Examiner—Aristotelis Psitos
Assistant Examiner—Alfonso Garcia
Attorney, Agent, or Firm—Lewis H. Eslinger; Jay H. Maioli

[57] ABSTRACT

A magnetic tape cassette includes a cassette casing composed of upper and lower cassette shells joined to each other, a pair of reel hubs rotatably disposed in the cassette casing and supported by the cassette shells, and a magnetic tape wound around the reel hubs and housed in the cassette casing. The cassette shells have a pair of sets of aligned holes defined therein for receiving hub drive shafts, respectively, and a pair of sets of circular recesses defined in inner surfaces of the cassette shells in coaxial surrounding relation to the holes. The reel hubs have axial holes for receiving the hub drive shafts and open ends loosely fitted in the recesses.

4 Claims, 4 Drawing Sheets

TAPE CASSETTE WITH TAPERED SELF-ALIGNING REEL HUBS

BACKGROUND OF THE INVENTION

1. Field of the Invention

The present invention relates to a magnetic tape cassette having a cassette casing and a tape-like record medium or magnetic tape wound around reel hubs and housed in the cassette casing.

2. Description of the Prior Art

One conventional magnetic tape cassette includes a tape-like record medium or magnetic tape wound around reel hubs and housed in a cassette casing, as disclosed in Japanese Utility Model Laid-Open Gazette No. 61-79887. Each of the reel hubs comprises an outer hub member around which the magnetic tape is wound and an inner hub member that is rotatable by a hub drive shaft inserted therein. The inner hub member is axially movably fitted in the outer hub member, and held in circumferential engagement with the outer hub member so that the inner and outer hub members are rotatable in unison with each other.

The magnetic tape is wound around the outer hub members of the reel hubs and housed in the cassette casing. The inner hub members of the reel hubs, in which the respective hub drive shafts are to be inserted, have opposite open ends inserted in holes that are defined in respective upper and lower shells of the cassette casing for the reception of the hub drive shafts therein. The opposite open ends of the inner hub members have axial end faces lying substantially flush with the outer surfaces of the upper and lower shells of the cassette casing. In use, the hub drive shafts are inserted in the inner hub members. When one of the hub drive shafts is rotated about its own axis, the corresponding inner hub member is rotated to cause the outer hub member fitted thereover in circumferential engagement to rotate, thereby winding and transporting the magnetic tape from the reel hub on the other drive shaft.

When the inner hub members are axially displaced, such an axial displacement is not transmitted to the outer hub members around which the magnetic tape is wound. Therefore, the magnetic tape is prevented from being laterally displaced or skewed even when the inner hub members are axially moved with respect to the outer hub members. However, since the end faces of the inner hub members are exposed on the outer surfaces of the upper and lower shells of the cassette casing, the inner hub members may be inadvertently turned about their own axes by fingers, for example. If an inner hub member is turned about its own axis, then the circumferentially engaging outer hub member is also turned by the inner hub member, with the result that the magnetic tape wound around the outer hub members is undesirably transported, or is unduly slackened or tensioned until it may finally be stretched, torn, or otherwise damaged.

Another problem of the conventional magnetic tape cassette is that when the magnetic tape cassette is loaded into a magnetic tape recording and reproducing apparatus, the hub drive shafts directly abut against the inner hub members, and engaging teeth on the hub drive shafts tend to be caught by the inner hub members. Consequently, the hub drive shafts may not smoothly be inserted into the inner hub members, making it difficult to load the magnetic tape cassette smoothly into the magnetic tape recording and reproducing apparatus.

OBJECTS AND SUMMARY OF THE INVENTION

In view of the aforesaid drawbacks of the conventional magnetic tape cassette, it is an object of the present invention to provide a magnetic tape cassette which includes reel hubs positioned entirely within a cassette casing for protection against access by fingers and hence against inadvertent rotation, and constructed to allow hub drive shafts to be inserted smoothly into the respective hubs.

According to the present invention, there is provided a magnetic tape cassette comprising a cassette casing composed of a pair of confronting cassette shells joined to each other, a pair of hubs rotatably disposed in the cassette casing and supported by the cassette shells, and a magnetic tape wound around the reel hubs and housed in the cassette casing. The cassette shells have a pair of sets of holes defined therein for receiving hub drive shafts, respectively, and a pair of sets of circular recesses defined in inner surfaces of the cassette shells in coaxial surrounding relation to the holes. The reel hubs have axial holes, respectively, for receiving the hub drive shafts and open ends loosely fitted in the recesses.

The reel hubs are housed entirely in the cassette casing and protected against direct access by fingers. Accordingly, the reel hubs are prevented from being inadvertently turned from outside of the cassette casing. As a result, the magnetic tape will not be unduly loosened or tensioned. When the hub drive shafts are inserted into the reel hubs, the hub drive shafts are smoothly guided by the holes in the upper and lower shells without directly hitting the reel hubs. Therefore, the magnetic tape cassette can easily and smoothly be loaded into a magnetic recording and reproducing apparatus.

The above and other objects, features, and advantages of the present invention will become apparent from the following detailed description of an illustrative embodiment thereof to be read in conjunction with the accompanying drawings, in which like reference numerals represent the same or similar objects.

DETAILED DESCRIPTION OF THE PREFERRED EMBODIMENT

FIGS. 1 through 4 show a magnetic tape cassette constructed in accordance with the present invention. While the magnetic tape cassette according to the present invention may be of any of various sizes, it is typically in the form of a miniature magnetic tape cassette.

Figure 1:
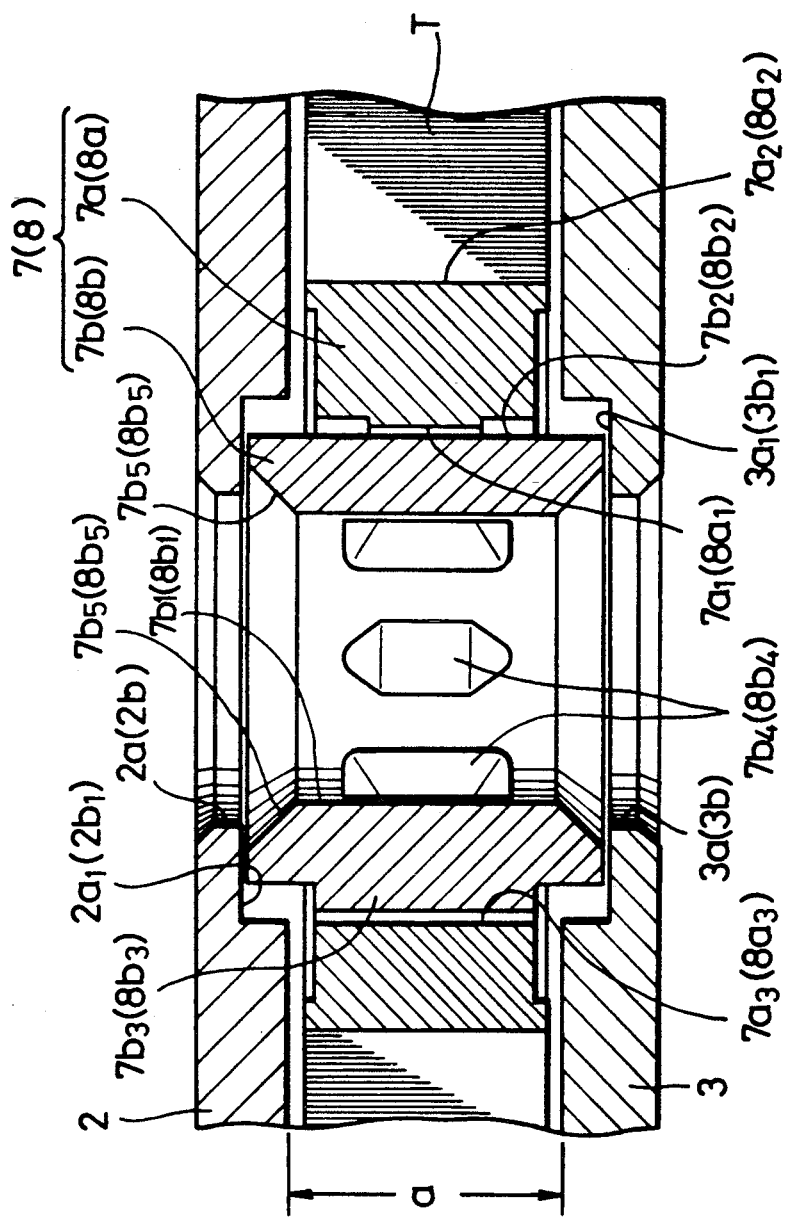
FIG. 1 is a fragmentary cross-sectional view of a magnetic tape cassette, according to the present invention.
Figure 2:
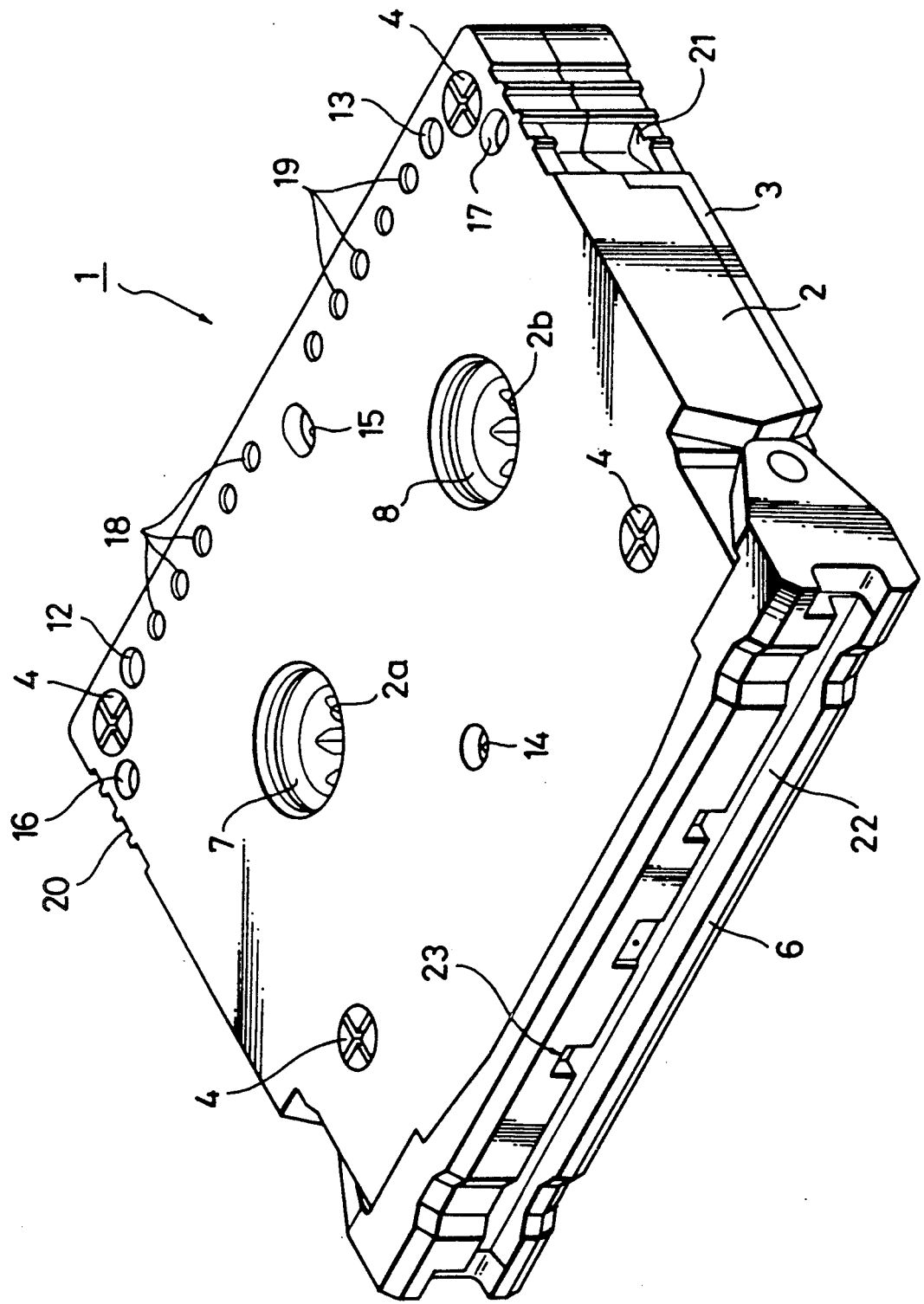
FIG. 2 is a perspective view of the magnetic tape cassette.
Figure 3:
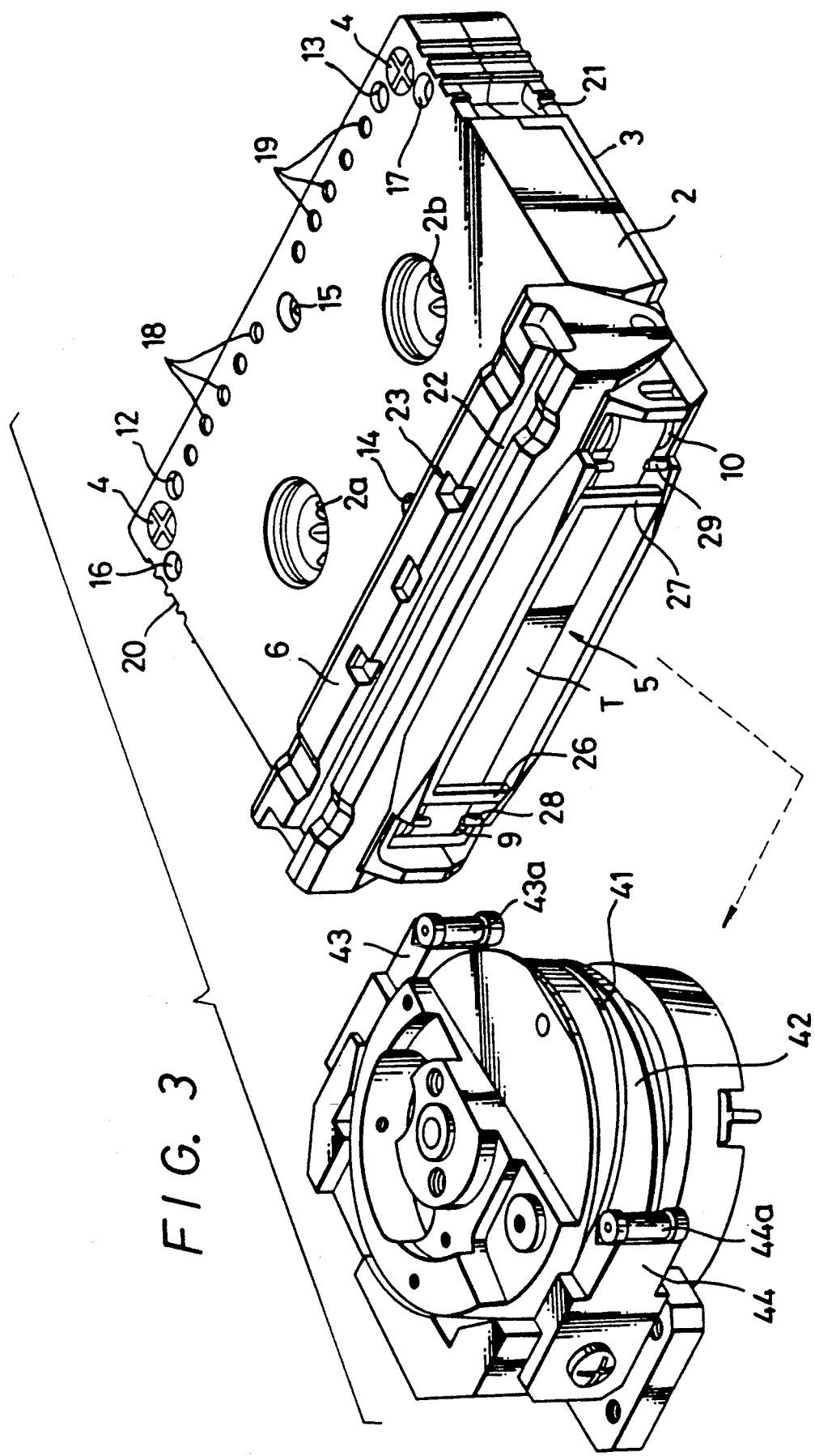
FIG. 3 is a perspective view of the magnetic tape cassette and a head drum supporting a rotating head which records signals on and reproduces signals from a magnetic tape housed in the magnetic tape cassette.

As shown in FIGS. 2 and 3, the magnetic tape cassette includes a cassette casing 1 which houses therein a magnetic tape for recording and reproducing PCM (pulse code modulated) signals, for example. The cassette casing 1 comprises an upper shell 2 and a lower shell 3 which are combined together in confronting relation to each other and fastened to each other by screws 4. The upper and lower shells 2, 3 have a front opening 5 defined in their front panels, the front opening 5 being selectively openable and closable by a lid 6 which is pivotally supported on the cassette casing 1. As shown in FIGS. 1 and 2, the upper shell 2 has a pair of spaced holes 2a, 2b defined therein for receiving respective hub drive shafts (not shown) in a magnetic tape recording and reproducing apparatus, and the lower shell 3 has a pair of spaced holes 3a, 3b defined therein for receiving the hub drive shafts, the holes 2a, 2b being aligned with the holes 3a, 3b, respectively. A pair of hubs 7, 8 are rotatably disposed in the cassette casing 1, i.e. between the upper and lower shells 2, 3 in alignment with the paired holes 2a, 3a and the paired holes 2b, 3b, respectively. As also shown in FIG. 3, the cassette casing 1 houses therein a magnetic tape T which is wound around the reel hubs 7, 8 and has portion exposed in the front opening 5. The exposed portion of the tape T is kept taut in the front opening 5 by and between pinch or guide rollers 9, 10 which are rotatably supported between the upper and lower shells 2, 3 on opposite sides of the front opening 5.

Figure 4:
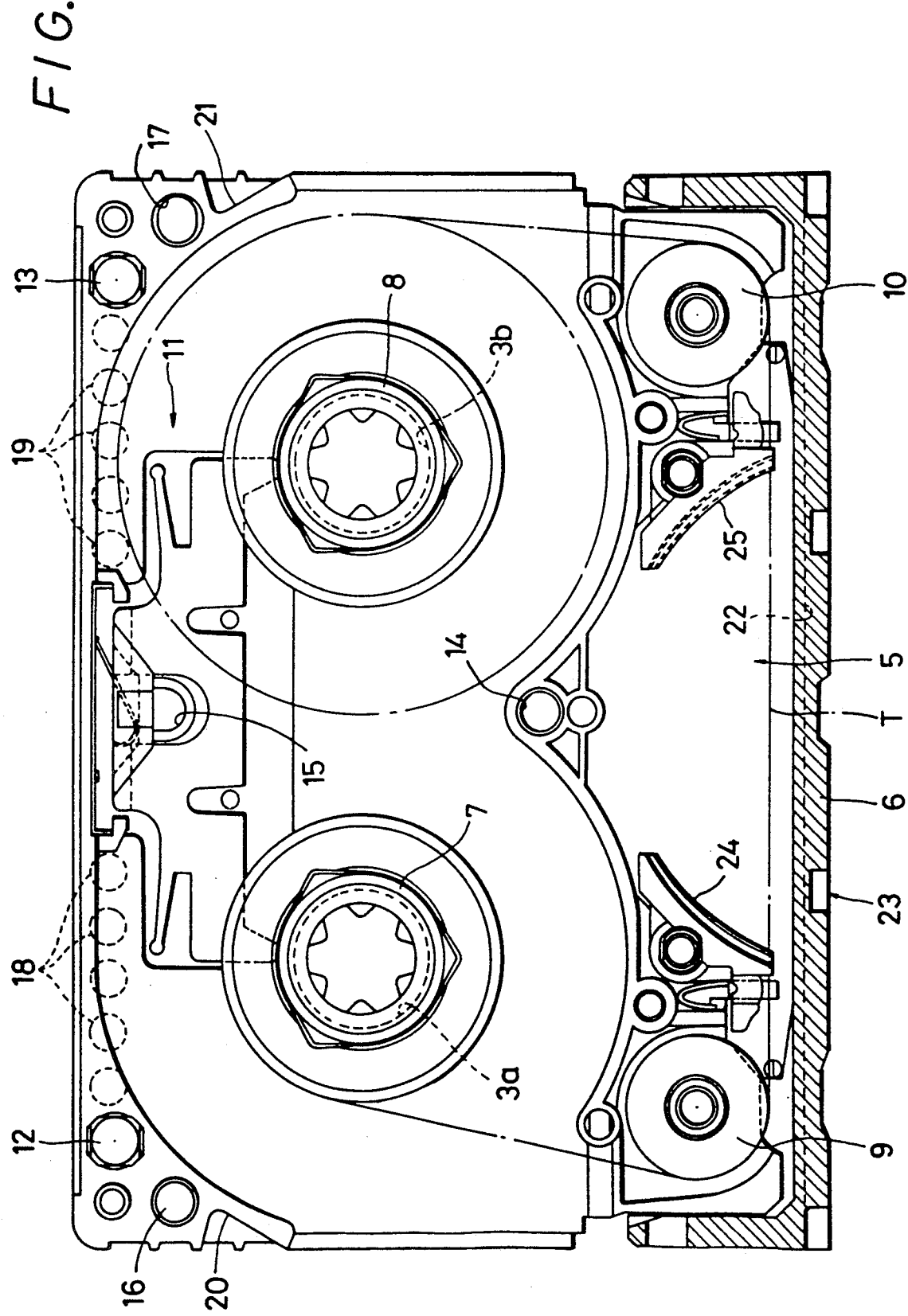
FIG. 4 is a plan view of a lower shell of the cassette casing of the magnetic tape cassette.

As illustrated in FIG. 4, the cassette casing 1 also houses therein a brake mechanism 11 for braking the hubs 7, 8 when the magnetic tape cassette is not in use. As shown in FIGS. 2, 3, and 4, each of the upper and lower shells 2, 3 has a pair of erase prevention mechanisms 12, 13 located respectively on the rear corners, a pair of positioning reference holes 14, 15 defined respectively in the front and rear edge portions in a longitudinally central region, a pair of positioning reference holes 16, 17 defined respectively in the rear corners or in the rear edge portion in longitudinally opposite side regions, a plurality of detection holes 18, 19 defined longitudinally across the rear edge portion, and a pair of grips 20, 21 located on the rear side portions, respectively.

The lid 6 for selectively opening and closing the front opening 5 has a changer engaging portion 23 formed along a guide groove 22 which is defined in an outer surface thereof and extends longitudinally therealong.

In use, signals can be recorded on and reproduced from the magnetic tape T housed in the cassette casing 1 by a rotating head 41 (FIG. 3) based on the helical-scan recording and playback principles.

More specifically, as shown in FIG. 3, the rotating head 41 is supported on a head drum 42 for rotation in a plane inclined with respect to the head drum 42 in the magnetic tape recording and reproducing apparatus (not shown). When the magnetic tape T is loaded in the magnetic tape recording and reproducing apparatus, the lid 6 is turned upwardly or downwardly, and the head drum 42 is partially inserted into the front opening 5. The magnetic tape T, which extends through the front opening 5, is now slidably held against the inserted peripheral surface segment of the head drum 42. When the head 41 rotates, inclined tracks are produced on the magnetic tape T in oblique relation to the longitudinal direction of the magnetic tape T.

In order to hold the magnetic tape T reliably in a helical fashion against the head drum 42, the cassette casing 1 has a pair of spaced tape guides 24, 25 (FIG. 4) disposed in the front opening 5 and having respective arcuate guide surfaces extending in opposite directions. The arcuate guide surfaces of the tape guides 24, 25 are complementary in shape to the circumferential surface of the head drum 42. The tape guides 24, 25 are positioned inwardly of the guide rollers 9, 10, respectively, in confronting relation to each other. The tape guides 24, 25 are swingable and laterally movable with respect to each other. When the head drum 42 is partially inserted into the front opening 5, the guide surfaces of the tape guides 24, 25 are swung and laterally moved into snug abutment against the inserted peripheral surface segment of the head drum 42, thereby sandwiching and guiding the magnetic tape T between the tape guides 24, 25 and the inserted peripheral surface segment of the head drum 42.

As shown in FIG. 3, two wing guides 43, 44 are mounted on diametrically opposite sides of the head drum 42, and two rollers 43a, 44a are mounted on front ends of the wing guides 43, 44, respectively. When the head drum 42 is partially inserted into the front opening 5, the wing guides 43, 44 are positioned between the pinch roller 9 and the tape guide 24 and between the pinch roller 10 and the tape guide 25, respectively, on the opposite sides of the front opening 5. The rollers 43a, 44a on the front ends of the wing guides 43, 44 are held in rolling contact with the magnetic tape T, pushing the magnetic tape T into pressing contact with the tape guides 24, 25.

The cassette casing 1 has a pair of spaced support bars 26, 7 extending vertically across the front opening 5 and positioned inwardly of the respective pinch rollers 9, 10, and a pair of sets of guide teeth 28, 29 for preventing the magnetic tape T from being displaced out of the cassette casing 1, the guide teeth 28, 29 being positioned between the support bar 26 and the pinch roller and between the support bar 27 and the pinch roller 10, respectively. The wing guides 43, 44 are inserted between the support bar 26 and the guide tooth 28 and between the support bar 27 and the guide tooth 29, respectively.

The reel hubs 7, 8 and their associated parts will now be described in detail with reference to FIG. 1. The reel hubs 7, 8 are structurally identical to each other, and only the reel hub 7 and its associated parts are shown in FIG. 1, with only reference characters of the other reel hub 8 and its associated parts being added in parentheses.

The reel hubs 7, 8 comprise respective outer hub members 7a, 8a and respective inner hub members 7b, 8b. The outer hub members 7a, 8a are in the form of drums and have respective inner circumferential surfaces $7a_1$, $8a_1$. The inner hub members 7b, 8b, which are of a hollow cylindrical shape, are axially slidably fitted in the outer hub members 7a, 8a, respectively, and have respective outer circumferential surfaces $7b_2$, $8b_2$ which are held in circumferential engagement with the inner circumferential surfaces $7a_1$, $8a_1$, respectively, so that the outer hub members 7a, 8a and the inner hub members 7b, 8b are rotatable in unison with each other. The outer hub members 7a, 8a have respective outer circumferential surfaces $7a_2$, $8a_2$ around which the magnetic tape T is wound. The inner hub members 7b, 8b have respective inner circumferential surfaces $7b_1$, $8b_1$ defining axial holes in which the hub drive shafts will be inserted.

The inner circumferential surfaces $7a_1$, $8a_1$ of the outer hub members 7a, 8a have a plurality of axial engaging recesses $7a_3$, $8a_3$ spaced at intervals in the circumferential direction. The inner hubs 7b, 8b have an outside diameter larger than the inside diameter of the holes $2a$, $3a$, $2b$, $3b$ for receiving the hub drive shafts, and a height or axial length slightly larger than the inner width of the cassette casing 1, i.e. the distance a between the inner surfaces of the upper and lower shells 2, 3. The outer circumferential surfaces $7b_2$, $8b_2$ of the inner hubs $7b$, $8b$ have a plurality of axial engaging teeth $7b_3$, $8b_3$ which axially movably engage in the respective axial engaging recesses $7a_3$, $8a_3$. Since the axial engaging teeth $7b_3$, $8b_3$ are axially movable with respect to, but circumferentially engage in the axial engaging recesses $7a_3$, $8a_3$ for circumferential movement in unison, the outer hub members $7a$, $8a$ and the inner hub members $7b$, $8b$ are axially slidable with respect to each other, but held in circumferential engagement with each other for rotational movement in unison with each other. The inner circumferential surfaces $7b_1$, $8b_1$ of the inner hub members $7b$, $8b$ have a plurality of circumferentially spaced engaging teeth or ridges $7b_4$, $8b_4$, which will be engaged by similar engaging teeth or ridges on the hub drive shafts. The inner hub members $7b$, $8b$ have tapered guide surfaces $7b_5$, $8b_5$ on axially opposite open ends thereof, which are contiguous to the inner circumferential surfaces $7b_1$, $8b_1$, and progressively inclined radially inwardly toward the inner circumferential surfaces $7b_1$, $8b_1$.

The upper and lower shells 2, 3 have circular recesses or stepped surfaces $2a_1$, $2b_1$ and $3a_1$, $3b_1$ defined in the inner surfaces thereof in coaxial surrounding relation to the holes $2a$, $2b$ and $3a$, $3b$, respectively. The circular recesses $2a_1$, $2b_1$ and $3a_1$, $3b_1$ are of a diameter larger than the outside diameter of the axial open ends of the inner hub members $7b$, $8b$. The circular axial open ends of the inner hub members $7b$, $8b$ are loosely fitted respectively in the circular recesses $2a_1$, $2b_1$ and $3a_1$, $3b_1$, so that the inner hub members $7b$, $8b$ are rotatably supported between the upper and lower shells 2, 3.

The reel hubs 7, 8 are housed in their entirety between the upper and lower shells 2, 3 and therefore concealed in the cassette casing 1 for protection against direct access by fingers from the outer surfaces of the upper and lower shells 2, 3. Therefore, the reel hubs 7, 8 are prevented from being inadvertently turned by fingers from outside of the cassette casing 1. Since the outside diameter of the inner hub members $7b$, $8b$, which define the holes for receiving the hub drive and $3a$, $b$ in the upper and lower shells 2, 3, and also since the inner hub members $7b$, $8b$ have tapered guide surfaces $7b_5$, $8b_5$, the hub drive shafts can smoothly be guided and inserted through the holes $2a$, $2b$ and $3a$, $3b$ into the holes in the inner hub members $7b$, $8b$, without directly hitting the reel hubs 7, 8. The reel hubs 7, 8 and the hub drive shafts are thus protected against damage when the magnetic tape cassette is loaded into the magnetic tape recording and reproducing apparatus.

The inside diameter of the holes in the reel hubs 7, 8 for receiving the hub drive shafts can be selected as desired without direct bearing on the holes $2a$, $2b$ and $3a$, $3b$ in the upper and lower shells 2, 3. Therefore, the reel hubs 7, 8 can be constructed with less design limitations and hence manufactured with ease.

Each of the illustrated reel reel hubs 7, 8 is composed of separate inner and outer hub members. However, the principles of the present invention are also applicable to a unitary hub in which a portion for winding a magnetic tape therearound and a portion for receiving a hub drive shaft are integral with each other.

While the present invention has been shown as being applied to a miniature magnetic tape cassette, it is also applicable to larger magnetic tape cassettes, such as compact tape cassettes, for example.

With the present invention, as described above, the reel hubs with the magnetic tape wound therearound have open ends loosely disposed in the recesses or stepped surfaces that are defined in the inner surfaces of the upper and lower shells of the cassette casing in coaxial relation to the holes in the upper and lower shells for receiving the hub drive shafts. The reel hubs are therefore housed in their entirety in the cassette casing and protected against direct access by fingers. Accordingly, the reel hubs are prevented from being inadvertently turned from outside of the cassette casing, with the result that the magnetic tape will not be unduly loosened or tensioned. Since the reel hubs are received in the recesses in the upper and lower shells, the reel hubs serve to keep the interior of the cassette casing hermetically sealed for protection against entry of dust particles or other foreign matter. When the hub drive shafts are inserted into the reel hubs, the hub drive shafts are smoothly guided by the holes in the upper and lower shells without directly hitting the reel hubs. Therefore, the magnetic tape cassette can easily and smoothly be loaded into the magnetic tape recording and reproducing apparatus.

Having described a preferred embodiment of the invention with reference to the accompanying drawings, it is to be understood that the invention is not limited to the precise embodiment and that various changes and modifications could be effected by one skilled in the art without departing from the spirit or scope of the invention a defined in the appended claims.

We claim as our invention:

1. A magnetic tape cassette comprising:
   a cassette casing composed of a pair of confronting cassette shells joined to each other;
   a pair of reel hubs each joined of an inner hub member and an outer hub member and each being rotatably disposed in said cassette casing and supported by said cassette shells, said inner hub members being generally tubular and having ends extending axially beyond said outer hub members to form axles;
   a magnetic tape wound around said reel hubs and housed in said cassette casing; and
   each of said cassette shells having a pair of axial holes defined therein, respectively, and each having a pair of circular recesses defined in inner surfaces of said cassette shells having a diameter larger than said axial holes in said cassette shells and being larger than an outer diameter of the axles of said inner hub members, said circular recesses being in a coaxial surrounding relation to said axial holes in said cassette shells, said axles of said inner hub members of said reel hubs disposed within said circular recesses having axial holes, respectively, and said tubular axles of said inner hub members have tapered inner guide surfaces, a large diameter of said tapered guide surface being larger than said axial holes in said cassette shells and a small diameter of said tapered guide surface being equal to an inner diameter of said inner hub members, so that said ends thereof are loosely fitted in said recesses.

2. A magnetic tape cassette according to claim 1, wherein each of said inner hub members is axially slidably disposed in a respective outer hub member and is held in circumferential engagement with said outer hub member for rotation in unison with each other.

3. A tape cassette housing a magnetic tape comprising:
- a pair of confronting cassette shells joined together to form a cassette casing, said cassette shells each having a pair of holes formed therein and circular recesses formed concentrically therewith on respective inner surfaces of said cassette shells, said holes and respective circular recesses in one of said pair of cassette shells begin aligned with said holes and respective circular recesses in the other of said pair of cassette shells upon said shells forming said cassette casing; and
- a pair of reel hubs formed of inner and outer hub members, each said inner hub member having substantially tubular ends extending axially beyond said outer hub member, about which the magnetic tape is wound, said tubular ends having an outer diameter greater than a diameter of said holes and less than a diameter of said circular recess and loosely residing within said circular recess in said cassette casing, so that said reel hubs are rotatably supported between said pair of cassette shells, said tubular ends of said inner hub members each being formed with an inner tapered surface, a large diameter of said inner tapered surface being greater than the diameter of said holes and a small diameter of said inner tapered surface forming an inside diameter of said inner hub member.

4. A tape cassette according to claim 3, wherein said inner hub member includes axial engaging teeth on an outer surface thereof and said outer hub member includes axial recesses on an inner surface thereof, said teeth residing in said recesses, whereby said inner hub member is axially slidable and circumferentially engaged with said outer hub member by said teeth residing in said recesses.

* * * * *

UNITED STATES PATENT AND TRADEMARK OFFICE
CERTIFICATE OF CORRECTION

PATENT NO. : 5,173,830

DATED : Dec. 22, 1992

INVENTOR(S) : Tanaka et al.

It is certified that error appears in the above-identified patent and that said Letters Patent is hereby corrected as shown below:

```
Col. 2, line 47, delete ","
Col. 3, line 7, "As"should start a new paragraph
C0l. 4, line 28, change "7" to--27--
        line 33, after "roller" insert--9--
Col. 5, line 16, change "8b" to--8b1--
        line 45, after "drive" insert--shafts,
        is larger than the inside diameter of the holes
        2a,2b--
Col. 6, line 32, change "a" to--as--
```

In the Claims:

Col. 6, line 37, change "joined" to--formed--

Signed and Sealed this

Twenty-second Day of March, 1994

Attest:

BRUCE LEHMAN

*Attesting Officer*    *Commissioner of Patents and Trademarks*